US011771110B2

(12) United States Patent
Hylkema et al.

(10) Patent No.: US 11,771,110 B2
(45) Date of Patent: Oct. 3, 2023

(54) DECOLORED RAPESEED PROTEIN ISOLATE

(71) Applicant: DSM IP ASSETS B.V., Heerlen (NL)

(72) Inventors: Nienke Nina Hylkema, Echt (NL); Gerardus Johannes Franciscus Smolders, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 292 days.

(21) Appl. No.: 16/761,660

(22) PCT Filed: Dec. 4, 2018

(86) PCT No.: PCT/EP2018/083424
§ 371 (c)(1),
(2) Date: May 5, 2020

(87) PCT Pub. No.: WO2019/110555
PCT Pub. Date: Jun. 13, 2019

(65) Prior Publication Data
US 2021/0177005 A1    Jun. 17, 2021

(30) Foreign Application Priority Data

Dec. 5, 2017 (EP) .................................... 17205438

(51) Int. Cl.
| | |
|---|---|
| *A23J 1/14* | (2006.01) |
| *A23K 20/147* | (2016.01) |
| *A23K 50/40* | (2016.01) |
| *A23L 11/30* | (2016.01) |
| *A23L 33/185* | (2016.01) |

(52) U.S. Cl.
CPC ............. *A23J 1/14* (2013.01); *A23K 20/147* (2016.05); *A23K 50/40* (2016.05); *A23L 11/34* (2016.08); *A23L 33/185* (2016.08); *A23V 2002/00* (2013.01)

(58) Field of Classification Search
CPC .......... A23L 33/185; A23L 1/34; A23L 11/34; A23J 1/14; A23J 1/006; A23K 20/147; A23K 50/40; A23V 2002/00; A23G 1/44; A23G 3/44; A23G 9/38
USPC ....................................................... 426/254
See application file for complete search history.

(56) References Cited

U.S. PATENT DOCUMENTS

| | | | | |
|---|---|---|---|---|
| 6,005,076 A | * | 12/1999 | Murray ..................... | A23J 1/14 530/377 |
| 2004/0077838 A1 | * | 4/2004 | Green ....................... | A23L 5/49 530/370 |
| 2005/0255226 A1 | * | 11/2005 | Schweizer ................ | A23J 3/14 426/656 |
| 2013/0005946 A1 | | 1/2013 | Willardsen et al. | |
| 2016/0031950 A1 | * | 2/2016 | Jaramillo Freydell ..... | C07K 14/415 530/377 |
| 2017/0280756 A1 | | 10/2017 | Jaramillo Freydell et al. | |

FOREIGN PATENT DOCUMENTS

| | | |
|---|---|---|
| DE | 10 2014 005466 A1 | 10/2015 |
| EP | 1720415 A1 | 11/2006 |
| EP | 1389921 B1 | 11/2010 |
| EP | 1715752 B1 | 1/2015 |
| WO | 2004000032 A2 | 12/2003 |
| WO | 2005067729 A1 | 7/2005 |
| WO | 2008094434 A2 | 8/2008 |
| WO | 2013000066 A1 | 1/2013 |
| WO | WO-2013000066 A1 * | 1/2013 ............... A23J 1/14 |
| WO | 2014018922 A1 | 1/2014 |
| WO | 2016042001 A | 3/2016 |
| WO | 2017102535 A1 | 6/2017 |

OTHER PUBLICATIONS

NPL Hoglund et al. ( in Plant Physiol. 98: 509-516, 1992). (Year: 1992).*
Google search for NPL Hoglund et al. (Retrieved on May 17, 2022). (Year: 2022).*
International Search Report for Application PCT/EP2018/083424 dated Jan. 23, 2019.

* cited by examiner

*Primary Examiner* — Donald R Spamer
*Assistant Examiner* — Bhaskar Mukhopadhyay
(74) *Attorney, Agent, or Firm* — MCBEE MOORE & VANIK IP, LLC; Susan McBee

(57) ABSTRACT

The present invention discloses a soluble native rapeseed protein isolate having improved color, a method for preparing a soluble native rapeseed protein isolate having improved color and use of said rapeseed protein isolate in a food product.

13 Claims, 2 Drawing Sheets

DECOLORED RAPESEED PROTEIN ISOLATE

CROSS-REFERENCE TO RELATED APPLICATIONS

This application is the National Stage entry of International Application No. PCT/EP2018/083424, filed 4 Dec. 2018, which claims priority to European Patent Application No. 17205438.9, filed 5 Dec. 2017.

BACKGROUND

Field

The present invention is directed to a soluble native rapeseed protein isolate having improved color, to a method for preparing a soluble native rapeseed protein isolate having improved color and to the use of said rapeseed protein isolate in a food product.

Description of Related Art

Protein is a main feature of human nutrition. This may be sourced from animals (e.g. meat, fish, egg, dairy) or vegetables. There is a general desire to reduce the amount of animal based protein. The use of egg protein is often undesirable.

The use of vegetable based protein in human nutrition is known, for example WO 2008/094434 discloses the use of wheat protein isolates as an alternative to the use of egg yolk protein. However, the use of wheat protein isolates may not be desirable for those with gluten allergies. The use of soy based protein instead of whey protein has also been described, for example in WO 2014/018922. Soy protein is widely used, but in view of some intolerances to soy products there is a need for other sources of vegetable proteins.

Suitable alternatives include pea protein and rapeseed protein. Rapeseed is rich in oil and contains considerable amounts of protein that account for 17 to 25% of seed dry weight. Processing rapeseed for oil for human consumption produces rapeseed meal (60%) as a by-product which contains about 30 to 40% protein. The rapeseed used for this purpose is usually of the varieties *Brassica napus* and *Brassica juncea*. These varieties contain low levels of erucic acid and glucosinolate, and are known as Canola. Canola is a contraction of Canada and ola, for "oil low acid", but is now a generic term defined as rapeseed oil comprising <2% erucic acid and <30 mmol/g glucosinolate. The resultant rapeseed meal is currently used as a high-protein animal feed.

Proteins are available as hydrolysates, concentrates and isolates. Hydrolysates are proteins that have been partially broken down by exposing the protein to heat, acid or enzymes that break apart the bonds linking amino acids. This makes it taste more bitter, but also allows it to be absorbed more rapidly during digestion than a native (non-hydrolyzed) protein. Isolates are purer than concentrates, meaning other non-protein components have been partially removed to "isolate" the protein. Many concentrates are around 80% protein, which means that on a dry basis, 80% of the total weight is protein. Isolates are typically around 90% protein (dry basis). This is calculated using the Kjeldahl method.

The predominant storage proteins found in rapeseed are cruciferins and napins. Cruciferins are globulins and are the major storage protein in the seed. Cruciferins are composed of 6 subunits and have a total molecular weight of approximately 300 kDa. Napins are albumins and are a low molecular weight storage protein with a molecular weight of approximately 14 kDa. Napins are more easily solubilized and in for example EP 1715752B1 a method is disclosed to separate out the more soluble napin fraction, preferably to at least 85 wt. %. Napins are primarily proposed for use used in applications where solubility is key. DE 10 2014 005466 A1 also describes a method for obtaining purified cruciferin and napin fractions. During the method, also a protein mixture of the two with 55-60% napins and 40-45% cruciferins is obtained. The solubility of this protein mixture is approximately 75%.

Rapeseed proteins can also be divided into various fractions according to the corresponding sedimentation coefficient in Svedberg units (S). This coefficient indicates the speed of sedimentation of a macromolecule in a centrifugal field. For rapeseed proteins, the main reported fractions are: 12S, 7S and 2S. Cruciferin and napin are the two major families of storage proteins found in canola/rapeseed. Napin is a 2S albumin, and cruciferin is a 12S globulin. Furthermore, Schwenke and Linow (Nahrung (1982) 26, K5-K6) state that reversible dissociation of the 12S globulin from rapeseed (*Brassica napus* L.) depends on ionic strength. The cruciferin complex is present as a 300 kDa 12S hexamer when exposed to higher ionic strength ($\mu \geq 0.5$ mS/cm), and reversibly dissociates into 7S trimeric molecules of 150 kDa when exposed to low ionic strength conditions.

Production of rapeseed protein isolates from rapeseed meal is, for example, described in EP 1389921B1, disclosing extracting rapeseed oil seed meal with an aqueous food-grade salt solution to form an aqueous protein solution, and subsequently two protein fractions are separated out via micelles. WO 2013/000066 discloses rapeseed protein products having a protein content of at least about 60 wt. % with a low phytic acid content, with a preference for equal portions of 2S and 7S with a minor content of 12S. EP 1720415 discloses a method for preparing a rapeseed protein isolate comprising 25 to 55 wt. % of 2S rapeseed protein, 47 to 75 wt. % of 7S rapeseed protein and 0 to 15 wt. % of 12S rapeseed protein. This method requires the use of high levels of salt, which is of no issue in aquaculture but not suitable for human nutrition. In WO 2016/042001 a method is described wherein there is no need to separate out the protein constituents and yet a solubility across a broader pH range can be maintained.

It has been found that high purity rapeseed protein isolate has a broadly-based functionality in food products, unique among proteinaceous materials. The ability to utilize a protein which is vegetable in origin in food products enables truly vegetarian food products to be provided in instances where egg white and/or animal-derived protein have been used in the absence of any available substitute.

A problem associated with rapeseed protein isolates produced by procedures as described above is that they possess a relatively dark yellow, or brownish, color and oftentimes an undesirable flavor. For example, coloration often makes a food product visually unattractive which makes acceptance of vegetable based protein in human nutrition unnecessarily problematic.

SUMMARY

In a first aspect of the invention there is provided a method for obtaining a native rapeseed protein isolate comprising the steps of:

i) mixing cold-pressed rapeseed oil meal with an aqueous liquid at a temperature of from 45 to 65° C.;

ii) separation of the aqueous liquid from the mixture obtained in step i);

iii) decreaming of the aqueous liquid obtained in step ii);

iv) adjusting the pH of the decreamed aqueous liquid obtained in step iii) to neutral by adding acid or base, and mixing with a precipitant to obtain a precipitate wherein said precipitant comprises a salt of magnesium, zinc, iron, or calcium;

v) removing the precipitate obtained in step iv) to obtain an aqueous liquid;

vi) concentrating and washing the aqueous liquid obtained in step v);

vii) isolating native rapeseed protein isolate from the concentrated and washed aqueous liquid obtained in step vi) by means of drying.

DETAILED DESCRIPTION OF A PREFERRED EMBODIMENT

Figure 1:
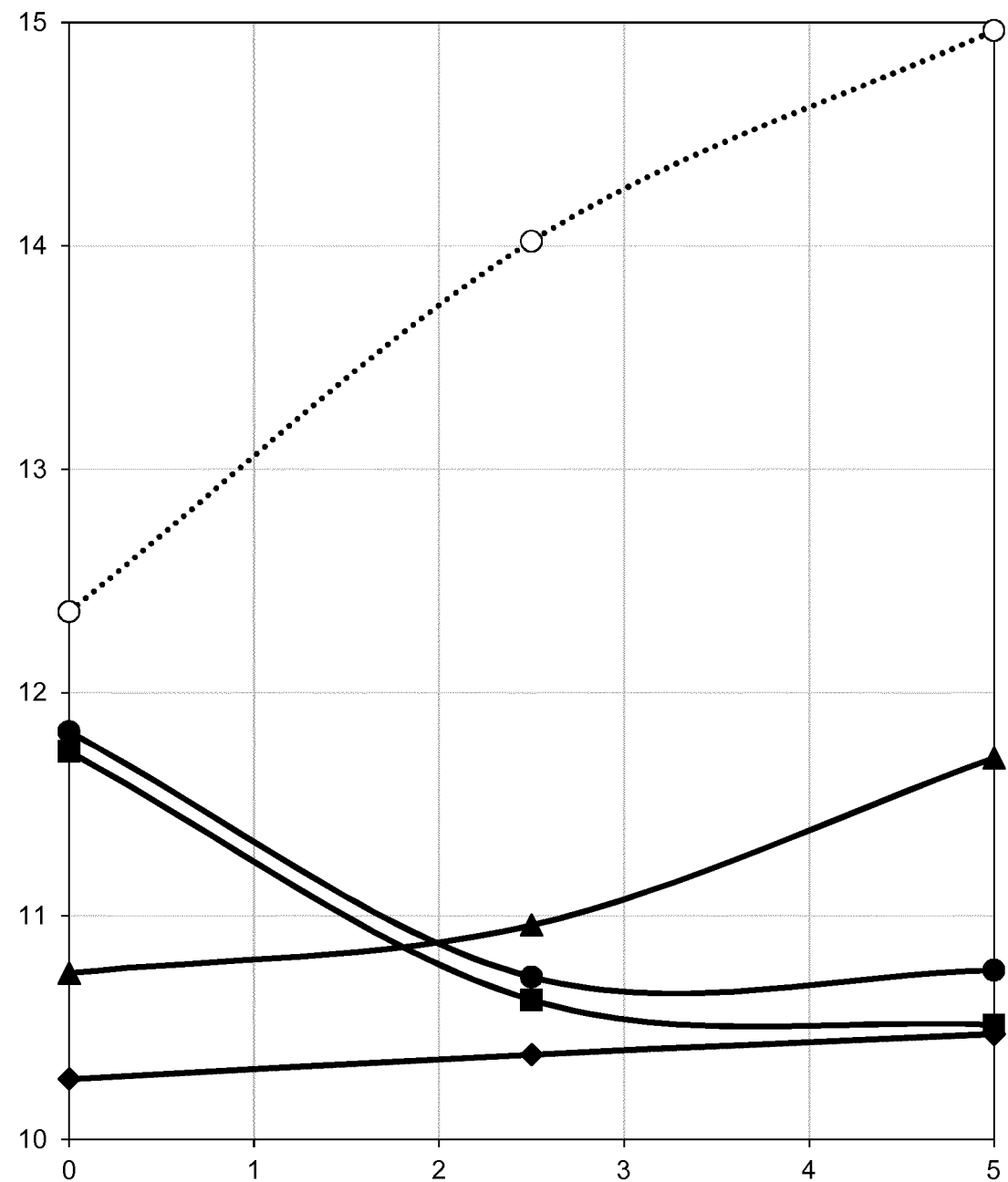
FIG. 1 depicts the color in solution obtained after treating rapeseed protein extracts with different concentrations of L-ascorbic acid or L-cysteine at different time intervals. X-axis: incubation time in hours. Y-axis: 100-L value. Explanation of the symbols: o=control; ●=L-ascorbic acid (0.5 g/kg); ■=L-ascorbic acid (1.0 g/kg); ▲=L-cysteine (0.5 g/kg); ♦=L-cysteine (1.0 g/kg).

The problem of coloration in rapeseed protein isolates is reported to stem from phenolic compounds. Rapeseed contains about ten times the quantity of phenolic compounds as is found in soybeans. Upon oxidation, phenolic compounds can give rise to the development of a dark color. In WO 2004/000032 the problem is addressed by advocating a multifaceted approach. This comprises the processing of the rapeseed (notably inactivation of myrosinase in the hulled seeds), the treatment of the meal (notably the use of solvents to extract phenolics and other coloring components), utilization of a specific form of meal (notably meal from which solvent is removed with air or toasted meal), the use of specific extraction conditions (notably by adding an antioxidant or a coloring component absorbing agent), the processing of the extract (notably diafiltration in the presence of an antioxidant) and the recovery of the isolate (notably by extracting the isolate with a solvent or by adding the concentrated solution to chilled water). Amongst the wide range of possible measures, WO 2004/000032 describes the application of antioxidants such as sodium sulfite or ascorbic acid to prevent oxidation of phenolics. The effect is measured by reduced absorbance at 420 nm (A420, oxidized phenolics) and maintained absorbance at 330 nm (A330, of non-oxidized phenolics). Indeed, the presence of ascorbic acid reduces A420 values and maintains A330 values. However, A330 and A420 values only give information on the presence or absence of the phenolics and yellow-colored phenolic oxidation products and gives no information on the overall whiteness of the product, which is usually expressed by measuring L values. However, for some experiments, WO 2004/000032 does report L values. Thus, L values between 80.67 and 83.53 are reported after color extraction with ethanol, L values around 81 are reported when combining an adsorbent with ascorbic acid and the highest L value (84.32) was observed in a precipitated rapeseed protein isolate wherein both ethanol extraction and treatment with ascorbic acid was used. Finally, in separate experiments, sodium sulfite shows improved A330 values, albeit in combination with an additional measure such as diafiltration. Given the prior art results, there is significant room for improvement of the whiteness of rapeseed protein isolates, i.e. for higher L values (or lower 100-L values, an alternative representation that is sometimes used for practical reasons).

In a first aspect of the invention there is provided a method for obtaining a native rapeseed protein isolate comprising the steps of:

i) mixing cold-pressed rapeseed oil meal with an aqueous liquid at a temperature of from 45 to 65° C.;

ii) separation of the aqueous liquid from the mixture obtained in step i);

iii) decreaming of the aqueous liquid obtained in step ii);

iv) adjusting the pH of the decreamed aqueous liquid obtained in step iii) to neutral by adding acid or base, and mixing with a precipitant to obtain a precipitate wherein said precipitant comprises a salt of magnesium, zinc, iron, or calcium;

v) removing the precipitate obtained in step iv) to obtain an aqueous liquid;

vi) concentrating and washing the aqueous liquid obtained in step v);

vii) isolating native rapeseed protein isolate from the concentrated and washed aqueous liquid obtained in step vi) by means of drying.

In the above method, ascorbic acid, or a derivative thereof and a sulfite are added before, during or after any of steps i) or ii) or iii) or iv) or v) or vi). The combined use of ascorbic acid (derivatives) and sulfites has not been reported or suggested in the prior art and, as further outlined below, results in unexpected effect.

As outlined above, the rapeseed protein isolate is produced from cold pressed rapeseed press meal, the by-product of rapeseed oil production.

The method starts with an extraction step i), in which rapeseed meal is combined with an aqueous salt solution, for example 0 to 5% sodium chloride, at a temperature between 4 to 75° C., more preferably 20 to 75° C. and most preferably 45 to 65° C. Preferably, in step i) said mixing is carried out such that the ratio between said cold-pressed rapeseed oil meal and said aqueous liquid is from 1:2 to 1:30 (w/w). Preferably the meal to water ratio is in the range of from 1:5 to 1:40, more preferably 1:5 to 1:20.

After a period in the range of from 5 min to 2 hours the protein rich solution is separated from the insoluble material in the separation step ii). The protein rich solution is hereafter referred to as the extract.

The pH of the extract is preferably adjusted to neutral and the extract is further processed to clarify the material and remove non-protein substances. In the decreaming step iii), the residual fat and formed precipitates are removed via a solid/liquid separation step (e.g. filtration or centrifugation). Preferably, the decreaming in step iii) is carried out by means of centrifugation.

The extract is then concentrated and washed in an ultrafiltration/diafiltration (UF/DF) step vi). The UF/DF step has the purpose of concentrating the protein and removing anti-nutritional factors (e.g. polyphenols, residual phytate, glucosinolates). The concentrating and washing in step vi) is preferably carried out by means of ultrafiltration and diafiltration.

Finally, in step vii), the washed concentrate may be dried in a suitable dryer, such as a spray drier (single or multi-stage) with an inlet temperature in the range of from 150 to 200° C. and an outlet temperature in the range of from 50 to 100° C. resulting in the rapeseed protein isolate.

In an embodiment, the ascorbic acid or a derivative thereof is L-ascorbic acid or calcium L-ascorbate or potassium L-ascorbate or sodium L-ascorbate. In another embodiment, the sulfite is an ammonium or metal salt of sulfite, bisulfite or metabisulfite. Non-limiting examples are sodium metabisulfite or potassium metabisulfite.

The amount of ascorbic acid or a derivative thereof can vary amongst wide ranges. Suitable examples are wherein the amount of ascorbic acid is from 0.05 to 5 g/kg, or from 0.25 to 1 g/kg relative to the mixture of cold-pressed rapeseed oil meal and aqueous liquid. The amount of sulfite is from 0.01 to 0.5 g/kg, or from 0.05 to 0.1 g/kg relative to the mixture of cold-pressed rapeseed oil meal and aqueous liquid. Alternatively, the amounts of ascorbic acid and sulfite are expressed in percentages relative to the total weight of the composition. Hence, for ascorbic acid this may range from 0.005 to 0.5% (w/w), or from 0.025 to 0.1% (w/w) and for sulfite this may range from 0.001 to 0.05% (w/w), or from 0.005 to 0.01% (w/w).

Interestingly, the combination of ascorbic acid or derivatives thereof with a sulfite resulted in an unprecedented effect. For example, the application of a metabisulfite results in an initial removal of color which appeared however not persistent over time and in some cases, after prolonged incubation, even results in a darker color. On the other hand, the application of ascorbic acid results in a smaller initial removal of color, but this is more stable over time and eventually results in significantly lower color values. When, according to the invention, ascorbic acid and metabisulfite are combined, an effect is observed whereby the resultant color of the process stream in question is below that of the stream tested with the individual components. Notably, L color values obtained according to the invention, as further defined in the second aspect of the invention, are significantly higher than those reported for prior art rapeseed protein isolates.

In one embodiment, method steps i)-vi) are carried out in 1-8 h, preferably in 3-5 h during which time span the maximal difference with the untreated control is observed. In another embodiment method steps i)-vi) are carried out in under 4 h, preferably from 30 min-3.5 h, conditions under which the color of the extract (expressed in 100-L), and hence that of the final product, is well below that of untreated extract but also below that of extract treated with ascorbic acid or sulfite alone.

An advantage of the method of the first aspect is that no significant decrease in the proteins of interest, notably cruciferins and napins, is observed. This is particularly surprising for the napins that are known to be prone to degradation. Under the conditions mentioned above napin concentrations remain above 95% of the initial napin concentration of the control.

An additional advantage of the method of the first aspect is that untreated clear solutions of rapeseed protein isolate obtained during the process have a tendency to develop a dark colored precipitate over time where this does not happen with samples obtained during the method of the invention.

Preferably the rapeseed protein isolate is obtained in a method without a fractionating step for separating out cruciferins and napins.

Preferably the rapeseed protein isolate is obtained in a method where the levels of napin and cruciferin are kept substantially constant (i.e. neither the napin (2S) or cruciferin (12S) levels are deliberately increased or decreased).

The method of the instant invention is characterized in that it is well-suited for large-scale application. Hence, in one embodiment the method is carried out at a scale of at least 500 kg, preferably of from 500 to 10,000 kg or from 1,000 to 5,000 kg.

In a second aspect of the invention, there is provided a native rapeseed protein isolate comprising 40 to 65 wt. % cruciferins and 35 to 60 wt. % napins and having a solubility of at least 88% over a pH range from 3 to 10 at a temperature of 23±2° C. which has, in a 1 wt. % solution in 0.2 M phosphate buffer at pH 6 and at 20±2° C., an L value of from 88 to 98. This range can be achieved following the method of the invention and has not been reported hitherto. Typical acceptable subranges for a solution of 1 wt % in water for L are from 88.5 to 95, or from 89 to 93, or 91±2. Hence, by performing the method of the first aspect, i.e. combining ascorbic acid or derivatives thereof together with a sulfite during the preparation of the rapeseed protein isolate, a product is obtained that is lower in color, i.e. has a higher whiteness, than any rapeseed protein isolate available or reported to date. This has a significant positive impact on acceptance of rapeseed protein isolate in a range of applications.

In one embodiment, the native rapeseed protein isolate comprises from 5% to 65% on dry matter of 12S rapeseed protein where the presence of 12S is verified by Blue Native PAGE. Preferably, the native rapeseed protein isolate comprises from 10% to 65%, most preferably from 15% to 65%, especially from 25% to 65% and most especially from 35% to 65% (on dry matter) of 12S rapeseed protein where the presence of 12S is verified by native PAGE. As outlined above, a certain content of 12S proteins is not necessarily the same as cruciferins as the cruciferin 300 kDa 12S hexamer can dissociate into 7S trimeric molecules of 150 kDa. Preferably, the native rapeseed protein isolate of the invention comprising less than 20% on dry matter of 7S rapeseed protein.

In one embodiment, the native rapeseed protein isolate has a ratio of cruciferins to napins (C/N ratio) of from 0.9 to 1.3.

In one embodiment, the native rapeseed protein isolate has a solubility of at least 88%, preferably at least 90%, more preferably at least 94% and most preferably at least 96% when measured over a pH range from 3 to 10 at a temperature of 23±2° C. This is also known as the soluble solids index (SSI).

For use in human food consumption the native rapeseed protein isolate preferably comprises a low level of salt. This can be established by measuring the conductivity. Preferably the conductivity of the native rapeseed protein isolate in a 2 wt. % aqueous solution is less than 9,000 μS/cm over a pH range of 2 to 12. More preferably the conductivity of the native rapeseed protein isolate in a 2 wt. % aqueous solution is less than 4,000 μS/cm over a pH range of 2.5 to 11.5. For comparison, the conductivity of a 5 g/l aqueous sodium chloride solution is around 9,400 μS/cm.

In another embodiment, the native rapeseed protein isolate has a phytate level less than 0.4 wt. %, more preferably less than 0.3 wt. % and most preferably less than 0.15 wt. %.

In still another embodiment, the native rapeseed protein isolate has a protein content of at least 90 wt. % (calculated as Kjeldahl N×6.25) on a dry weight basis, more preferably at least 94 wt. %, most preferably at least 96 wt. % and especially at least 98 wt. %.

Preferably the native rapeseed protein isolate is substantially unhydrolyzed. By substantially unhydrolyzed is meant that the protein is not deliberately hydrolyzed.

An advantage of the rapeseed protein isolate of the second aspect of the invention is that the amount of sulfite present is below the labeling specification of 10 ppm. The invention allows to tune the amounts of ascorbic acid and sulfite added during the process and by doing so a high whiteness, i.e. high L value, can be achieved whilst simultaneously controlling the sulfite content of the end product below 10 ppm, for example below 8 ppm, or between 1 and 9 ppm or between 2 and 8 ppm. Such values can be achieved using the ranges mentioned in the first aspect of the invention.

In a third aspect, the native rapeseed protein isolate may be used in any nutritional food applications, be it for human, pet, or veterinary applications, including as a foaming agent to replace egg whites, as an emulsifying agent to replace for example egg yolk in mayonnaise and simply as a nutritional component providing an excellent amino acid profile. Hence, the invention provides the use of a native rapeseed protein isolate according to the second aspect of the invention as a foaming agent for food products or as an emulsifying agent for food products. Consequently, the invention provides a food product or a pet food product comprising a native rapeseed protein isolate according to the second aspect of the invention. The rapeseed protein isolate of the present invention can function as protein additive in food products such as bars, chocolate, ice cream, and the like.

EXAMPLES

Test Methods

Protein Content

Protein content was determined by the Kjeldahl method, AOAC Official Method 991.20 Nitrogen (Total) in Milk, using a conversion factor of 6.25, to determine the amount of protein (% w/w).

Color Measurement Using UV-Spectrophotometer

Color values were determined using an UV-spectrophotometer (TECAN Infinite M1000 Pro plate reader) with 96-wells plates. The sample volume per well was 275 μl. Samples were clarified by filtration (0.45 μm) before absorbance measurements.

Measured absorbance at 400-700 nm (10 nm interval, corrected for blank (MilliQ water)) was converted to L values using the formulas as described in DIN 5033 Part 3 and DIN 6174. For the calculation of L, illuminant D65 was used and the "CIE 1964 supplementary standard colorimetric observer" standard spectral functions with an observer angle of 10°. For comparison of 100-L between different samples, extrapolated 100-L values were used since L (or 100-L) does not have a linear relationship with sample concentration.

Samples were taken from in-process streams at equal pH, without further dilution.

Color Measurement Using Hunterlab Spectrophotometer
Color spectrophotometer: Hunterlab UV VIS, D-SV032
Accessory: Cuvette Holder, placed between sphere and lens
Mode: RTRAN-Regular Transmission, UVF nominal
Port plate: Standard, 25.400 mm
Standardization: White color reference standard
Blank: Cuvette filled with buffer solution
Sample cuvette: Brandt 7590.05, Plastic, 10×10 mm With the Hunterlab spectrophotometer, color is defined as a fixed point in three-dimensional space. The parameters measured are the L, a, and b values.

- L value: the amount of white saturation in a sample: a value of 100 is white, a value of 0 is black
- a value: the color saturation green to red: a positive value is the red saturation, a negative value is the green saturation
- b value: the color saturation yellow to blue: a positive value is the yellow saturation, a negative value is the blue saturation
- YI E313: Yellowness Index (ASTM E313); a mathematical calculation that is used to express the yellowness of a sample: the higher the value, the more yellow the sample is For defining whiteness obtained after decolorization, the measured L values are preferably used.

Conductivity

The conductivity of native rapeseed protein isolate in a 2 wt. % aqueous solution was measured using a conductivity meter: Hach sensION+EC71.

Solubility Test:

The below solubility test is adapted from Morr et al. (J. Food Sci. (1985) 50, 1715-1718), the difference being the use of water instead of 0.1 M sodium chloride.

Sufficient protein powder to supply 0.8 g of protein was weighed into a beaker. A small amount of demineralized water was added to the powder and the mixture was stirred until a smooth paste was formed. Additional demineralized water was then added to make a total weight of 40 g (yielding a 2% w/w protein dispersion). The dispersion was slowly stirred for at least 30 min using a magnetic stirrer. Afterwards the pH was determined and adjusted to the desired level (2, 3, 4, etc.) with sodium hydroxide or hydrochloric acid. The pH of the dispersion was measured and corrected periodically for 60 minutes stirring. After 60 minutes of stirring, an aliquot of the protein dispersion was reserved for protein content determination (Kjeldahl analysis). Another portion of the sample was centrifuged at 20,000 g for 2 min. The supernatant and pellet were separated after centrifugation. The protein content was also determined by Kjeldahl analysis.

Protein solubility (%)=(protein in supernatant/protein in total dispersion)×100.

Alternative methods for determining solubility are available and in some case use buffers, like borate-phosphate buffer in WO 2011/057408. However, such as values are incomparable with the ones obtained in the instant application that are determined in the absence of buffer.

MW Determination by Blue Native PAGE

In the case of Native PAGE, the protein charge has an impact on the electrophoretic mobility. In the case of Blue native PAGE (and to the contrary of clear native PAGE), the Coomassie Brilliant Blue dye provides the necessary charges to the protein complexes for the electrophoretic separation. The proteins were dissolved in 500 mM sodium chloride. As high salt concentrations are incompatible with electrophoretic separation, the sample was diluted 10-fold with water (final salt concentration: 50 mM). Coomassie® G-250 (SimplyBlue™, ThermoFischer Scientific) was used and gels were scanned with an ExQuest™ Spot Cutter (BioRad). Resultant bands after carrying out Blue Native PAGE were observed. It would be expected that bands around 14 kDa indicate 2S, around 150 kDa indicate 7S and around 300 kDa indicate 12S proteins.

Cruciferin/Napin (C/N) Ratio

The C/N ratio was determined by Size Exclusion Chromatography (SEC) analysis. Samples were dissolved in a 500 mM sodium chloride saline solution and analyzed by HP-SEC using the same solution as the mobile phase. Detection was done by measuring UV absorbance at 280 nm. The relative contribution of cruciferin and napin (%) was calculated as the ratio of the peak area of each protein with respect to the sum of both peak areas.

Phytate Level

Phytates were measured at Eurofins using method QD495, based on Ellis et al. (Anal. Biochem. (1977) 77, 536-539).

Comparative Example 1

Preparation of Rapeseed Protein Isolate from Cold-Pressed Rapeseed Oil Seed Meal in the Absence of Added Decoloring Substances The rapeseed protein isolate was produced from cold-pressed rapeseed oil seed meal having an oil content of less than 15% on dry matter basis, cleaned and processed below 75° C.

In the extraction step, the cold-pressed rapeseed oil seed meal was mixed with an aqueous salt solution (1 to 5% sodium chloride), at a temperature between 40 to 75° C. The meal to aqueous salt solution ratio was in the range of from 1:5 to 1:20. After about 30 minutes to 1 hour the protein rich solution (extract) was separated from the insoluble material. The pH of the extract was adjusted to neutral and the extract was further processed to clarify the material and remove non-protein substances. In the decreaming step, the residual fat was removed via a liquid/liquid separation step using centrifugation. Non-protein substances were removed by adjusting the pH of the material to neutral in the presence of a salt with which phytate precipitates (e.g. calcium chloride). The formed precipitate is removed via a solid/liquid separation step (e.g. a membrane filter press or centrifugation) in which the impurities are removed in a solid salt form (e.g. calcium phytate). The extract was then concentrated and washed in an ultrafiltration/diafiltration (UF/DF) step. Finally, the washed concentrate was dried in a spray drier with an inlet temperature in the range of from 150 to 200° C. and an outlet temperature in the range of from 50 to 100° C. resulting in the rapeseed protein isolate. Several batches were prepared and tested.

The conductivity of the resultant native rapeseed protein isolates in a 2% solution was less than 4,000 µS/cm over a pH range of 2.5 to 11.5.

Blue Native PAGE: Main bands were observed roughly around 300 kDa, between the 242 and 480 kDa MW markers (FIG. 1). Some staining was visible as a smear as lower MW (150 kDa and below). No clear bands were observed at 150 kDa. Based on these results, the rapeseed product contains the 12S form of cruciferin.

The resultant native rapeseed protein isolate comprised in the range of from 40 to 65% cruciferins and 35 to 60% napins.

The resultant native rapeseed protein isolate contained less than 0.26 wt. % phytate.

The resultant native rapeseed protein isolates had a solubility of at least 88% when measured over a pH range from 3 to 10 at a temperature of 23±2° C. as shown for two batches in the below Table:

| pH | 3 | 4 | 5 | 6 | 7 | 8 | 9 | 10 |
|---|---|---|---|---|---|---|---|---|
| Sample 1 Solubility (%) | 98 | 96 | 89 | 95 | 95 | 97 | 97 | 98 |
| Sample 2 Solubility (%) | 102.5 | 97.5 | 94.3 | 93.9 | 97.0 | 93.0 | 94.0 | 99.8 |

Example 1

Preparation of Rapeseed Protein Isolate from Cold-Pressed Rapeseed Oil Seed Meal in the Presence of L-Ascorbic Acid or L-Cysteine The extraction part of the procedure as described in Comparative Example 1 was repeated in five different ways. Following the precipitate removal via solid/liquid separation step and before concentration and washing, the extract was diluted 9:1 w/w with a 2% solution of sodium chloride in water and the following decoloring agents (all solutions pH 5.9):

I. None (control)
II. L-Ascorbic acid (0.5 g/kg, final concentration)
III. L-Ascorbic acid (1.0 g/kg, final concentration)
IV. L-Cysteine (0.5 g/kg, final concentration)
V. L-Cysteine (1.0 g/kg, final concentration)

Incubation was performed in a shaking water bath (55° C.; 0-5 h) in closed 50 ml Greiner tubes (22 g sample per tube, one tube per concentration). The results of color measurements using the method described above with a UV spectrophotometer are given in FIG. 1. It was observed that the color of the control increased during incubation (+20% after 5 h), whereas the extracts with L-ascorbic acid decreased within the first 2.5 h and were stable between 2.5 and 5 h and the color of the extracts with L-cysteine initially decreased, and gradually increased again for the 0.5 g/kg sample and was stable for the 1.0 g/kg sample.

The yields on cruciferins and napins at t=0 h and at t=5 h were determined, see Table below.

For the cruciferins, no relevant decrease in yield was observed during incubation for all conditions tested (−2% to +1%). For the napins, no significant decrease in yield was observed for the control and the L-ascorbic acid samples, whereas for the samples incubated with L-cysteine losses were observed (−12% and −22% after 5 h.

Table: Cruciferin and napin yield during incubation of clarified extract without (control) or with L-ascorbic acid or L-cysteine. The cruciferin and napin concentrations at t=0 h were set at 100%, with $[\text{cruciferin}]_{t=0\ h}=7.1$ mg/g and $[\text{napin}]_{t=0\ h}=5.7$ mg/g.

|  | Cruciferins (%) | | Napins (%) | |
|---|---|---|---|---|
| Additive | t = 0 h | t = 5 h | t = 0 h | t = 5 h |
| None | 100 | 101 | 100 | 98 |
| L-Ascorbic acid, 0.5 g/kg | 99 | 100 | 99 | 96 |
| L-Ascorbic acid, 0.5 g/kg | 99 | 100 | 99 | 96 |
| L-Cysteine, 0.5 g/kg | 99 | 99 | 99 | 88 |
| L-Cysteine, 1.0 g/kg | 99 | 98 | 98 | 78 |

Example 2

Preparation of Rapeseed Protein Isolate from Cold-Pressed Rapeseed Oil Seed Meal in the Presence of L-Ascorbic Acid and/or Sodium Metabisulfite The procedure as described in Comparative Example 1 was repeated in seven different ways, with different extraction liquid concentrations of the following additives at pH 5.9:

I. None (control)
II. L-Ascorbic acid (0.5 g/kg)
III. Sodium metabisulfite (0.1 g/kg)
IV. L-Ascorbic acid (0.5 g/kg) plus sodium metabisulfite (0.1 g/kg)
V. L-Ascorbic acid (0.5 g/kg) plus sodium metabisulfite (0.05 g/kg)
VI. L-Ascorbic acid (0.25 g/kg) plus sodium metabisulfite (0.1 g/kg)
VII. L-Ascorbic acid (0.25 g/kg) plus sodium metabisulfite (0.05 g/kg)

Number of runs performed for each combination of L-ascorbic acid and sodium metabisulfite were as in the below Table:

| Sodium metabisulfite (g/kg in extraction liquid) | L-Ascorbic acid (g/kg in extraction liquid) | | |
|---|---|---|---|
|  | 0 | 0.25 | 0.5 |
| 0 | 2 | — | 1 |
| 0.05 | — | 3 | 1 |
| 0.1 | 1 | 1 | 1 |

Figure 2:
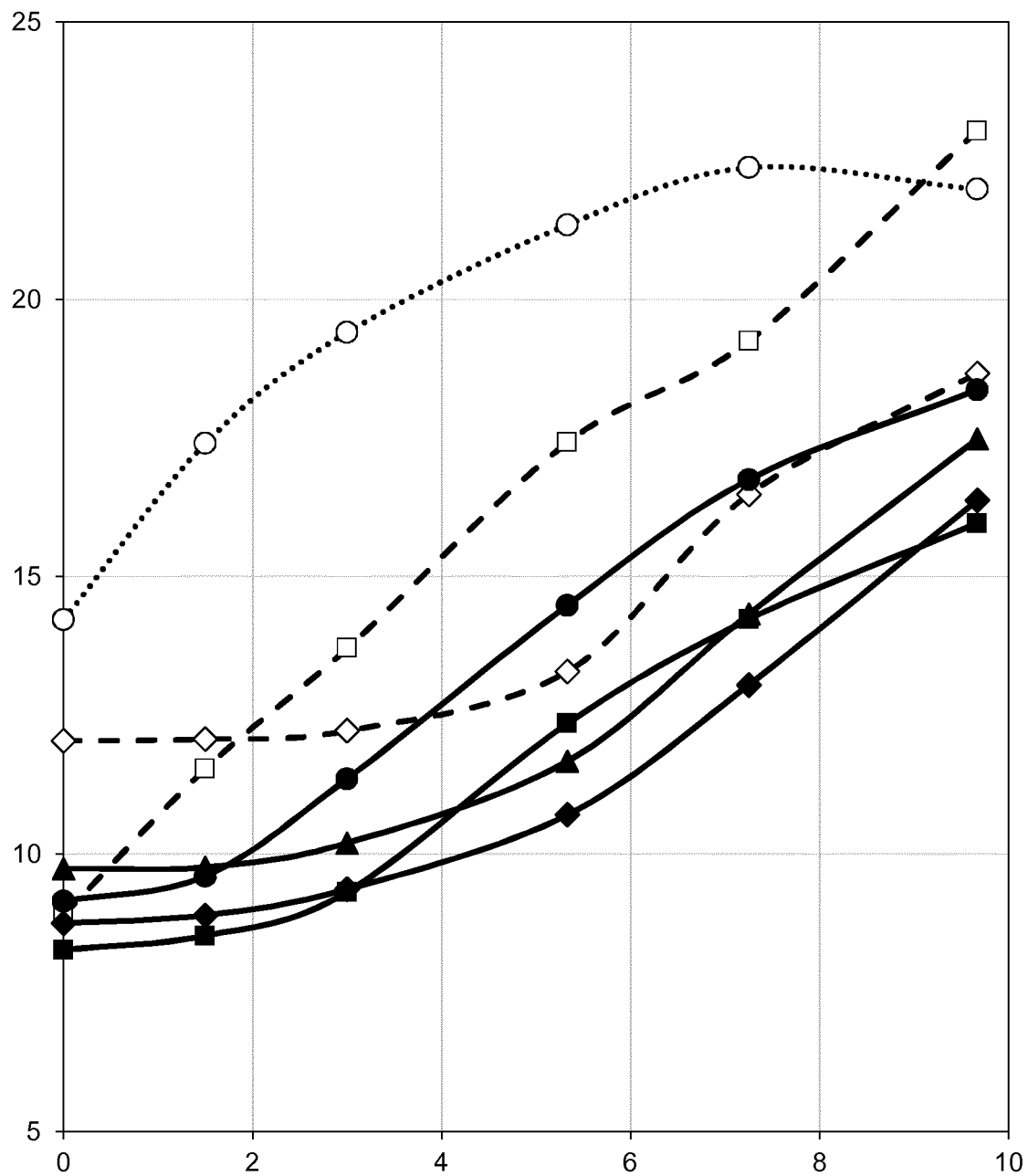
FIG. 2 depicts the color in solution obtained after incubation at 56° C. of rapeseed protein extracts, prepared with different concentrations of L-ascorbic acid and/or sodium metabisulfite in the extraction liquid at different time intervals. X-axis: incubation time in hours. Y-axis: 100-L value. Note that, following the measurements at t=3 h, experiments were temporarily stopped by storing the samples for a longer time (10 weeks) at −20° C. After this, measurements were continued by continuing incubation at 56° C. at the times indicated in the Figure, i.e. the time span wherein samples were frozen is omitted from the graph. Explanation of the symbols: o=control; ◇=L-ascorbic acid (0.5 g/kg); □=sodium metabisulfite (0.1 g/kg); ●=L-ascorbic acid (0.25 g/kg) plus sodium metabisulfite (0.05 g/kg); ■=L-ascorbic acid (0.25 g/kg) plus sodium metabisulfite (0.1 g/kg); ▲=L-ascorbic acid (0.5 g/kg) plus sodium metabisulfite (0.05 g/kg); ♦=L-ascorbic acid (0.5 g/kg) plus sodium metabisulfite (0.1 g/kg).

Following the precipitate removal via a solid/liquid separation step and prior to concentration and washing, incubation was performed in a shaking water bath (56° C.; 100 rpm; 0-3 h) in 50 ml Greiner tubes (closed lid). Samples for HP-SEC and color analysis were taken from the incubation tube at t=0 h, t=1.5 h and t=3 h. At t=3 h the samples were stored frozen (−20° C.). After 10 weeks of storage, the experiment was continued by thawing and centrifuging (10,000 g; 5 min) the samples and continuing incubation as described above. Samples for color analysis were taken every ~2 h. The results of color measurements using the method described above with a UV spectrophotometer are given in FIG. 2.

The yield on napins (in %) during incubation of clarified extract without (control) or with L-ascorbic acid and/or sodium metabisulfite at t=0 h, t=1.5 h and at t=3 h was determined. The napin concentration of the control at t=0 h was set at 100%, with $[napin]_{t=0\ h}$=7.55 mg/g. See below Table:

| Additive | t = 0 h | t = 1.5 h | t 3 h |
|---|---|---|---|
| None | 100 | 100 | 100 |
| L-Ascorbic acid, 0.5 g/kg | 102 | 102 | 102 |
| Sodium metabisulfite (0.1 g/kg) | 100 | 100 | 99 |
| L-ascorbic acid (0.25 g/kg) plus sodium metabisulfite (0.05 g/kg) | 99 | 98 | 99 |
| L-ascorbic acid (0.25 g/kg) plus sodium metabisulfite (0.1 g/kg) | 100 | 97 | 98 |
| L-ascorbic acid (0.5 g/kg) plus sodium metabisulfite (0.05 g/kg) | 97 | 99 | 100 |
| L-ascorbic acid (0.5 g/kg) plus sodium metabisulfite (0.1 g/kg) | 101 | 99 | 98 |

Standard deviations for color analysis, cruciferins, napins and cruciferin/napin ratio, obtained for the center point (L-ascorbic acid (0.25 g/kg) plus sodium metabisulfite (0.05 g/kg)) were as follows:

| Time | Standard Deviation (%) | | | |
|---|---|---|---|---|
| (h) | Color | Cruciferin | Napin | Cruciferin/Napin |
| 0 | 1.6 | 0.7 | 2.0 | 2.1 |
| 1.5 | 1.1 | 2.1 | 2.9 | 0.8 |
| 3 | 0.6 | 2.1 | 1.7 | 0.9 |
| 5.3 | 1.1 | Not measured | Not measured | Not measured |
| 7.3 | 0.5 | Not measured | Not measured | Not measured |
| 9.7 | 0.5 | Not measured | Not measured | Not measured |

With respect to color, it was observed that sodium metabisulfite results in an initial removal of color (i.e. lower 100-L value) which is not persistent over time, in fact 100-L surpasses that of the untreated control after 9 hours of incubation. For L-ascorbic acid, a smaller initial removal of color is observed, however this effect is more stable over time and eventually results in a 100-L value that is significantly below that of the control. When L-ascorbic acid and sodium metabisulfite are combined, an additional effect is observed. This applies for all tested combinations during the first three hours, i.e. L-ascorbic acid (0.25 g/kg) plus sodium metabisulfite (0.05 g/kg), L-ascorbic acid (0.25 g/kg) plus sodium metabisulfite (0.1 g/kg), L-ascorbic acid (0.5 g/kg) plus sodium metabisulfite (0.05 g/kg), and L-ascorbic acid (0.5 g/kg) plus sodium metabisulfite (0.1 g/kg), for 3 hours. For the combinations, wherein L-ascorbic acid is at least 0.5 g/kg and/or sodium metabisulfite is at least 0.1 g/kg, an effect was observed also during the subsequent 7 hours. Generally, the relative color difference between control and extracts treated with both L-ascorbic acid and sodium metabisulfite was maximal (approximately 50%) between 3-5 h of incubation.

For the napins, no significant decrease in yield was observed for the control nor for any of the tested concentrations of L-ascorbic and/or sodium metabisulfite, all remained well above 95% of the initial napin concentration of the control within the first three hours of incubation.

Example 3

Preparation of Rapeseed Protein Isolate from Cold-Pressed Rapeseed Oil Seed Meal in the Presence of L-Ascorbic Acid and Sodium Metabisulfite In a series of preparations, the procedure as described in Comparative Example 1 was repeated on pilot plant scale whereby L-ascorbic acid and sodium metabisulfite were added during the extraction step (percentages in the below Table relative to weight of the mixture of rapeseed oil seed meal and aqueous salt solution). Color of the dried product of two batches was determined using the method described above with a Hunterlab spectrophotometer. Solutions of 1% were prepared in a 0.2 M phosphate buffer at pH 6. Before measurement the samples were filtered on a 0.45 μm filter to remove particles if present. Measured values were as follows:

| # | L-ascorbic acid (%) | sodium metabisulfite (%) | L | a | B | YI E313 |
|---|---|---|---|---|---|---|
| 1 | 0 | 0 | 87.33 | −2.64 | 22.13 | 44.72 |
| 2 | 0 | 0 | 87.98 | −3.36 | 24.15 | 48.03 |
| 3 | 0.044 | 0.006 | 91.08 | −4.74 | 22.41 | 41.79 |
| 4 | 0.044 | 0.006 | 89.45 | −4.34 | 22.72 | 43.51 |
| 5 | 0.044 | 0.006 | 88.69 | −4.65 | 23.81 | 45.90 |
| 6 | 0.044 | 0.006 | 89.13 | −4.69 | 24.54 | 47.16 |
| 7 | 0.044 | 0.006 | 89.66 | −4.93 | 24.09 | 45.78 |
| 8 | 0.088 | 0.0082 | 92.87 | −5.86 | 24.25 | 43.79 |
| 9 | 0.088 | 0.0082 | 93.43 | −8.7 | 32.13 | 56.95 |
| 10 | 0.088 | 0.0082 | 92.38 | −8.58 | 33.57 | 60.57 |
| 11 | 0.088 | 0.0082 | 93.32 | −5.78 | 23.8 | 42.75 |

The invention claimed is:

1. A method for obtaining a native rapeseed protein isolate comprising:
   i) mixing cold-pressed rapeseed oil meal with an aqueous liquid at a temperature from 45 to 65° C., wherein ascorbic acid or a derivative thereof and sodium metabisulfite is added during the mixing;
   ii) separating the aqueous liquid from a mixture obtained in i);
   iii) decreaming the aqueous liquid obtained in ii);
   iv) adjusting pH of the decreamed aqueous liquid obtained in iii) to neutral by adding acid or base, and mixing with a precipitant to obtain a precipitate wherein said precipitant comprises a salt of magnesium, zinc, iron, or calcium;
   v) removing the precipitate obtained in iv) to obtain an aqueous liquid;
   vi) concentrating and washing the aqueous liquid obtained in v);
   vii) isolating the native rapeseed protein isolate from the concentrated and washed aqueous liquid obtained in vi) by drying;
   wherein the amount of L-ascorbic acid added in i) is from 0.05 to 5 g/kg of the mixture of cold-pressed rapeseed oil meal and aqueous liquid and the amount of sodium metabisulfite is from 0.01 to 0.5 g/kg of the mixture of cold-pressed rapeseed oil meal and aqueous liquid, and wherein the isolated native rapeseed isolate comprises 40 to 65 wt. % cruciferins,
   wherein less than 20% of the cruciferins are 7S cruciferins, and 35 to 60 wt. % napins.

2. The method according to claim 1 wherein said ascorbic acid or a derivative thereof is L ascorbic acid or calcium L ascorbate or potassium L ascorbate or sodium L ascorbate.

3. The method according to claim 1 wherein the amount of L-ascorbic acid is from 0.25 to 1 g/kg of said mixture of cold-pressed rapeseed oil meal and aqueous liquid and the amount of sodium metabisulfite is from 0.05 to 0.1 g/kg of said mixture of cold-pressed rapeseed oil meal and aqueous liquid.

4. A native rapeseed protein isolate obtained by the method according to claim 1, which has a solubility of at least 88% over a pH range from 3 to 10 at a temperature of 23±2° C., and which has, in a 1 wt. % solution in 0.2 M phosphate buffer at pH 6 and at 20±2° C., an L value of from 88 to 98.

5. The native rapeseed protein isolate according to claim 4, comprising from 35% to 65% on dry matter of 12S rapeseed protein where the presence of 12S is verified by Blue Native PAGE.

6. The native rapeseed protein isolate according to claim 4 having a conductivity in a 2 wt. % aqueous solution of less than 9,000 μS/cm over a pH range of 2 to 12.

7. The native rapeseed protein isolate according to claim 4 comprising less than 20% on dry matter of 7S rapeseed protein.

8. The native rapeseed protein isolate according to claim 4 with a C/N ratio in a range from 0.9 to 1.3.

9. The native rapeseed protein isolate according to claim 4 with a phytate level less than 0.4 wt. %.

10. The native rapeseed protein isolate according to claim 4 with a solubility of at least 94% when measured over a pH range from 3 to 10 at a temperature of 23±2° C.

11. The native rapeseed protein isolate according to claim 4 with a sulfite level from 1 to 9 ppm.

12. A product comprising the native rapeseed protein isolate according to claim 4 in a food product.

13. A food product or a pet food product comprising the native rapeseed protein isolate according to claim 4.

* * * * *